INVENTORS.
Vernon A. Stenger
Clayton E. Van Hall
BY William A. Norris
ATTORNEY

United States Patent Office 3,196,893
Patented July 27, 1965

3,196,893
AUTOMATICALLY DISCHARGING
CONDENSATE TRAP
Vernon A. Stenger and Clayton E. Van Hall, Midland,
Mich., assignors to The Dow Chemical Company, Midland, Mich., a corporation of Delaware
Filed June 14, 1963, Ser. No. 287,858
2 Claims. (Cl. 137—204)

The present invention concerns a condensate trap with an automatic discharge.

It is most desirable and an object of this invention that a condensate trap be provided for removing condensate from gas streams and continually discharging it from the system. In particular, it is an object to provide means whereby such condensate is automatically removed from the trap. These and other objects will become apparent hereinafter as the invention is more fully described.

In the accompanying drawings, wheresoever possible, like characters of reference designate corresponding material and parts throughout the several views, in which.

In accordance with the present invention, there is provided a vessel with upper and lower portions, the upper portion of which has at least one inlet and at least one outlet for gaseous fluid flow. The lower portion of the vessel communicates with a capillary passage in a discharge conduit. This conduit terminates, i.e., discharges, at an elevation above its opposite end which receives condensate from the lower portion of the vessel. The terminology "elevation above" in this context has reference to the relationship indicated by the upper and lower portions of the vessel, the former being at an "elevation above" the latter.

Figure 1:
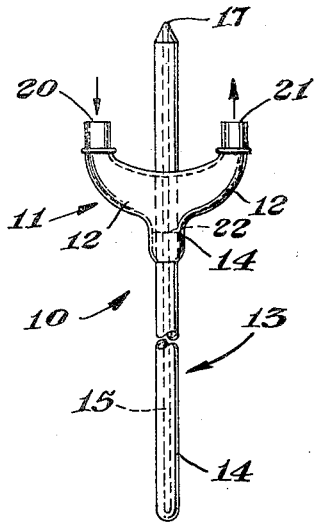
FIGURE 1 is a front elevation of a condensate trap having an automatic discharge in accordance with the invention.
Figure 2:
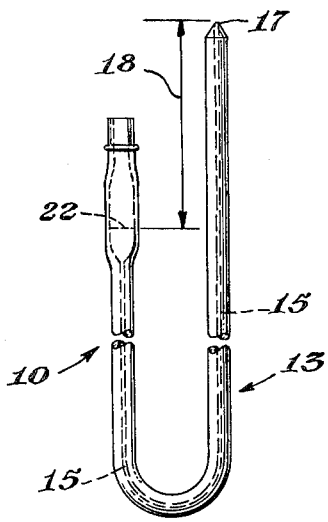
FIGURE 2 is an end elevation thereof.

In the FIGURES 1 and 2 is shown an exemplary automatic trap 10 which comprises a U-shaped tubular vessel 11 with an upper portion 12 consisting essentially of a tubular conduit having an inlet 20 and an outlet 21. The lower portion 14 of the vessel, i.e., condensate trap, communicates with a capillary passage 15 in a discharge conduit 13. This conduit forms a U-shape and its discharge end 17 rises to an elevation above the condensate trap 14. The operating elevation 18 of the capillary discharge end 17 above a designed condensate level 22 in the condensate trap 14 is equal to (A) the height condensate will rise in the particular capillary passage 15 employed plus (B) a static liquid condensate head equal to the steady state gas pressure maintained within the vessel 11 during use of the trap 10. Illustratively, if water is the condensate, the operating elevation 18 of the capillary discharge end 17 over designed condensate level 22 in the trap 14 is equal to the height water will rise in the capillary plus the hydrostatic head necessary to counterbalance the operating pressure within the system.

A device of the present invention, such as the one described above, is incorporated into a gas train from which it is desired to separate condensate. Integration into the gas train can be made by any convenient connecting means such as rubber tubing at the inlet 20 and outlet 21. Ordinarily, the automatic trap 10 will be positioned in the gas train after a condenser or cooling zone wherein the condensate is formed.

A gas train having such means for condensate removal is particularly useful in confining the oxidation products of organic materials for analytical purposes. In such operations, organic materials are burned in an oxygen stream and the resulting gaseous products are passed through a gas train in which the condensate forms as the gases cool. Since combustion may be erratic, especially upon initiation of combustion, the gas pressure within the system is subject to sudden surges of short duration. By using the automatic trap 10 having the capillary passage 15 discharging at a proper operating elevation 18, the amount of condensate that can escape the trap 14 during such pressure surges is reduced to an amount less than the accumulated condensate within the trap. During continuous operation under steady state pressure, a rise in the level of accumulated liquid condensate in trap 14 to even slightly above the designed condensate level 22 results in discharge of condensate from the trap at a rate which increases until it is equal to the rate of condensate accumulation. Discharge of condensate continues until the liquid level in the trap returns to the designed condensate level 22.

The advantages of such a collection device are continuous condensate removal in a system that requires no special attention after proper adjustment to operating conditions, such removal being accomplished by means which accommodate sudden and repeated pressure surges.

Optional embodiments shown respectively in FIGURES 3–4 and FIGURES 5–6 function in a substantially identical manner to that shown in FIGURES 1–2, except that the former embodiments are modified for the adjustment of the operating elevation 18 of the capillary discharge end 17 over the designed condensate level 22.

Figure 3:
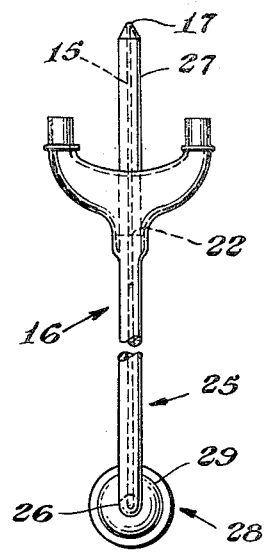
FIGURE 3 is a front elevation of another embodiment of an automatically discharging condensate trap having a rotating adjustment for operating pressure regulation.
Figure 4:
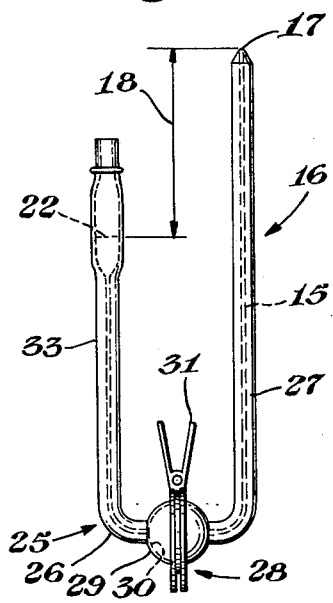
FIGURE 4 is an end elevation thereof.

In FIGURES 3–4 the automatic trap 16 has a discharge conduit 25 consisting of a fixed arm 26 and a movable arm 27, the latter having a capillary passage 15 communicating with a liquid passage 33 in the former. The movable arm 27 can be rotated to give a variable operating elevation 18. Rotation is accomplished through a spherical joint 28 consisting of a coupled ball 29 and socket 30 held together by a clamp 31. Since the tendency of liquid condensate to rise in the capillary passage 15 is constant for a given condensate and capillary size, the rotation of the movable arm 27 provides a means for adjusting the liquid head to correspond to any internal operating pressure within the capability of the adjustment.

Figure 5:
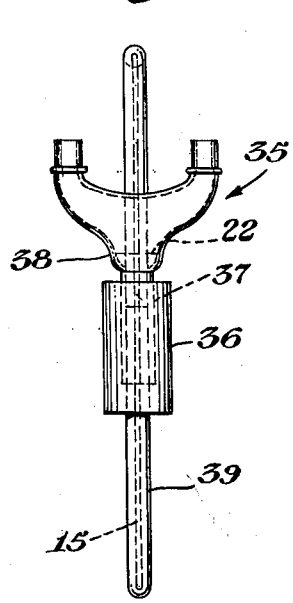
FIGURE 5 is a front elevation of a third embodiment of an automatically discharging condensate trap having a sliding adjustment for operating pressure regulation.
Figure 6:
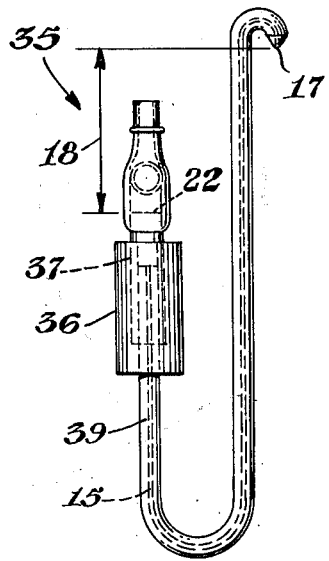
FIGURE 6 is an end elevation thereof.

FIGURES 5–6 show another automatic trap 35 similarly adapted for adjustment to correspond to a range of internal operating pressures but in this instance the adjustment is simple vertical sliding engagement between the condensate trap 38 discharge nipple 37 and a discharge conduit 39 extending from within the nipple 37. The flexible tubing connector 36 provides the necessary seal between the movable components.

While the preferred material of construction for the automatic traps described herein is glass, other materials such as metals and organic plastics which are impervious to liquids can be used for one or more component parts of the trap. Depending upon the chemical nature of the condensate, it may be desirable to select materials of construction having special resistances to chemical action.

What is claimed is:

1. An apparatus for separating liquid condensate from a gas train comprising an enclosed vessel with upper and lower portions, the latter being termed a trap hereinafter, the upper portion having at least one inlet and at least one outlet for gaseous fluid flow, the trap having a designed liquid level and communicating with a capillary passage in a discharge conduit, said conduit extending from the trap and terminating at its discharge end at an operating elevation above the designed liquid level of the trap, said operating elevation corresponding to the sum of (1) the height to which the liquid condensate rises in the capillary passage and (2) the static condensate head which equals the pressure within the gas train.

2. An apparatus as in claim 1 wherein the discharge conduit having a capillary passage therein is made of glass.

References Cited by the Examiner
FOREIGN PATENTS 18,542    1908    Great Britain.
697,551    11/30    France.

WILLIAM F. O'DEA, *Primary Examiner.*

ISADOR WEIL, *Examiner.*